United States Patent [19]

Lewine

[11] Patent Number: 5,784,565
[45] Date of Patent: Jul. 21, 1998

[54] SERVER FOR EITHER ANONYMOUS OR PRE-AUTHORIZED USERS TO ORDER GOODS OR SERVICES ON THE WORLD-WIDE WEB COMPUTER NETWORK

[76] Inventor: Donald A. Lewine, 40 Maclean Dr., Sudbury, Mass. 01776

[21] Appl. No.: 796,029

[22] Filed: Feb. 5, 1997

Related U.S. Application Data

[63] Continuation of Ser. No. 432,610, May 1, 1995.

[51] Int. Cl.$^6$ ................................................ G06F 15/16
[52] U.S. Cl. ........................... 395/200.59; 395/200.33; 395/200.49
[58] Field of Search ................. 395/200.33, 200.47, 395/200.49, 200.55, 200.59; 705/26–27, 43

[56] References Cited

U.S. PATENT DOCUMENTS

| 4,992,940 | 2/1991 | Dworkin | 705/26 |
| 5,220,501 | 6/1993 | Lawlor et al. | 705/43 |
| 5,319,542 | 6/1994 | King, Jr. et al. | 705/27 |

OTHER PUBLICATIONS

Kuwait Data Archive (KuDA) http://atd.ucar.edu/kuwait.kuda.title.html Feb. 17, 1994.

*Primary Examiner*—Mehmet B. Geckil

[57] ABSTRACT

A method is disclosed for determining a user's identity and creating a virtual session using the HTTP protocol without modifying the protocol or changing its stateless nature.

13 Claims, 1 Drawing Sheet

---

Welcome to intertain.com

---

101

ICON

Before you choose a book, we need to know where to send it and how you'd like to pay for it. Feel free to look around without setting up a profile.

110

102

ICON

Search for books by author and title without a using a profile. Profiles are our way of avoiding asking you to identify yourself each time you chose to buy a book. If you'd prefer not to fill out a profile, you are welcome to buy as many books as you'd like, identifying yourself each time.

103

120

ICON

Create my intertain.com profile so that I only need to enter the information once.

Welcome to intertain.com

101

Before you choose a book, we need to know where to send it and how you'd like to pay for it. Feel free to look around without setting up a profile.

110

102

Search for books by author and title without a using a profile. Profiles are our way of avoiding asking you to identify yourself each time you chose to buy a book. If you'd prefer not to fill out a profile, you are welcome to buy as many books as you'd like, identifying yourself each time.

120

103

Create my intertain.com profile so that I only need to enter the information once.

Figure 1

SERVER FOR EITHER ANONYMOUS OR PRE-AUTHORIZED USERS TO ORDER GOODS OR SERVICES ON THE WORLD-WIDE WEB COMPUTER NETWORK

CROSS REFERENCE TO RELATED APPLICATIONS

This application is a continuation of co-pending application Ser. No. 04/432,610 and claims an effective filing date of May 1, 1995. Appendix A describing the HTTP protocol and Appendix B describing the HTML language have both been deleted. These topics are now well known in the art and Appendix A and Appendix B did not teach anything not already widely available. The title and abstract have been changed to reflect the invention claimed in this application and line numbers have been added. Except for these changes and the claims, nothing else has been added or changed.

BACKGROUND—FIELD OF INVENTION

This invention relates to performing transactions over a computer network. More particularly, it relates to performing retail client/server transactions on the internet using the Hypertext Transfer Protocol (HTTP).

BACKGROUND—DESCRIPTION OF PRIOR ART

For fifty years, people have dreamed of the concept of a universal information database—data that would not only be accessible to people around the world, but information that would link easily to other pieces of information so that only the most important data would be found by a user. Only now has technology caught up with these dreams, making it possible to implement them on a global scale. This global system is called the World-Wide Web or WWW.

The WWW began in March 1989, when Tim Berners-Lee of CERN (a collective of European high-energy physics researchers) proposed the project to be used as a means of transporting research and ideas effectively throughout the organization.

Months after CERN's original proposal, the National Center for Supercomputing Applications (NCSA) began a project to create an interface to the World-Wide Web. One of NCSA's missions is to aid the scientific research community by producing widely available, non-commercial software. The NCSA's Software Design Group began work on a versatile, multi-platform interface to the World-Wide Web and called it Mosaic.

The use of Mosaic during the second half of 1993 and 1994 has been growing rapidly. There are now millions of copies distributed on computers all over the world.

The Web works under the popular client-server model. A web server is a program running on a computer whose only purpose is to serve documents to other computers when asked to. A Web client is a program that interfaces with the user and requests documents from a server as the user asks for them. Here is an example of how the process works:

1. Running a Web client (also called a browser), the user selects a piece of hypertext connected to another text, say "Manual of Patent Examining Procedures."
2. The Web client connects to a computer specified by a network address somewhere on the Internet (say, www.uspto.gov) and asks that computer's Web server for the "Manual of Patent Examining Procedures."
3. The server responds by sending text and any other media within that text (pictures, sounds, or movies) to the user's screen. In our example, the server might provide an index to the MPEP which contains links to other documents.

The language that Web clients and servers use to communicate with each other is called the HyperText Transmission Protocol (HTTP). All Web clients and servers must be able to speak HTTP in order to send and receive hypermedia documents. For this reason, Web servers and often called HTTP servers.

The phrase "World-Wide Web" is often used to refer to the collective network of servers speaking HTTP as well as the global body of information available using the protocol.

The standard language the Web uses for creating and recognizing hypermedia documents is the HyperText Markup Language (HTML).

A good book on the World-Wide Web is "The World-Wide Web Unleashed" by John December. While "The World-Wide Web Unleashed" provides a good background for understanding the current invention, it was published after the invention was made and should not be considered prior art.

One of the major disadvantages of the HTTP protocol is that it is stateless. A request is sent from the client to the server and the server completes the entire request at once and sends a single reply message ending the transaction. It is not possible to carry on a dialog using the HTTP protocol because there is no history of previous transactions.

There have been attempts to build state information into HTTP transactions. James E. Pitkow and Margaret M. Recker describe using the hidden attribute of the TYPE field used in HTML forms. (See "Using the Web as a Survey Tool: Results for the Second WWW User Survey" to be published in the 1995 WWW Conference Report for details.) Pitkow and Recker's scheme is restricted to HTML forms and cannot be used for text web pages. Also, the forms must be computed on-the-fly imposing a great deal of overhead compared to documents which can merely be read from a file.

Another scheme encodes the user identification into the URL used to access the data. This scheme has several disadvantages. First, it defeats many caching schemes thus providing lower performance. Second, the user cannot save a particular location in his "hotlist" because there is session information in the URL.

Most people attempting to sell products using the World-Wide Web put up with the limitations of HTTP and require the user to enter her name, address, and credit card number for every item she wants to buy. Some people even require the customer to print the screen and FAX it to the store.

OBJECTS AND ADVANTAGES

One object of the current invention is to allow the user to create a profile identified by a username and password. The user enters his full name, address, and method of payment once when he creates his profile and he never has to enter it again.

Another object of the current invention is to allow the user to enter his username and password and the start of a session and not have to repeatedly supply his username and password.

Another object of the current invention is to allow the user to shop without using a profile and enter her name, address and method of payment for each transaction, just like the prior art. The shopper is allowed to create a profile but she is not forced to create one.

BRIEF DESCRIPTION OF THE DRAWINGS

FIG. 1 A Web page with hyper-links.

SUMMARY

The current invention extends to capabilities of the HTTP protocol to allow a user to identify himself and create a session, he can then conduct transactions during that session without identifying himself again. He can select items to be purchased and add them to his order. All of the parts of the order are linked together and the order may be processed after the end of the session.

The current invention takes advantage of the protection mechanism of the http protocol in a way never envisioned by the authors of the protection mechanism.

The protection mechanism is designed so that selected web pages may be accessed only by people who know the password. In that way, a web server can have public pages and private pages.

The protection mechanism also allows an entire UNIX directory tree to be protected. For example, /known may be a protected directory and all of the files in the directory (including other directories) are all protected. If the user had to enter his username and password every time he wanted to access a protected page, there would be a large burden on the user. Most browsers, therefore, remember the username and password for a given directory. So, if /known was accessible using the username of dlewine and the password of bigbooks, the browser would remember the username & password for /known and each time the user attempts to access a file (web page) in the /known directory, the browser send the username and password to the web server.

The present invention uses the protection mechanism to trick the browser into sending the username and password on every access. Thus, without making any modifications to the millions of browsers in the world, the web server using this invention is able to know exactly who is accessing each web page.

Once the server knows the username and password it is able to lookup the users real name, shipping address, credit card numbers and other information.

PREFERRED EMBODIMENT—DESCRIPTION

In the preferred embodiment, there are two parallel web hiearcheries. One is called /store and the other is called /known.

The user first accesses the store by using the URL http://intertain.com/store/welcome.html. In the welcome.html file is the following hyperlink:

```
<H3>Do you have an intertain.com profile?
<A HREF="/known/welcome.html">YES</A>
or
<A HREF="/store/no.html">NO</H3></A>
```

If the use clicks NO he gets the following html code:

```
<HTML>
<HEAD>
<TITLE>Access the internet bookstore</TITLE>
</HEAD>
<BODY>
<IMG SRC="/store/icons/BlueMarbleLine.gif" ALT=" ">
<H1>Welcome to intertain.com</H1>
<IMG SRC="/store/icons/BlueMarbleLine.gif" ALT=" ">
<P><IMG SRC="/store/icons/Warning.gif" ALT=" ">
<B>Before you choose a book</B>, we need to
know where to send it and how you'd like to
pay for it. Feel free to look around without
setting up a profile.</P>
<P>
<A HREF="/store/search.html"><IMG SRC="/store/icons/books.gif" ALT=" ">
Search for books by author and title
without a using a profile</A>.
Profiles are our way of avoiding asking you to identify
yourself each time you chose to buy a book. If you'd
prefer not to fill out a profile, you are welcome to
buy as many books as you'd like, identifying
yourself each time.</P>
<P>
<A HREF="/store/new-acct.html"><IMG SRC="/store/icons/face.gif" ALT=" ">
Create my intertain.com profile</A>
so that I only need to enter the information once.</P>
</BODY>
</HTML>
```

This code produces the image shown in FIG. 1. There are several little pictures (icons) 101, 102, 103 which make the screen more interesting. There are two hyperlinks. The first link 110 allows the user to operate without a profile. It links to the /store directory which is not protected. The second link 120 lets the user create a profile.

If the user clicks on YES she is linked over the /known/welcome.html file. That page is protected and the server sends back a code 401 ACCESS DENIED message. The user is then asked for a username/password pair. If she supplies the correct pair, access is allowed and her browser remembers her username and password for future access to the server.

It is important that one the user is "known" all hyperlinks refer the user back to the /known directory tree. For static web pages, it is simple to maintain a parallel set of files: one in the /store directory tree and one in the /known directory tree. Once the user identifies himself and links over to the /known tree, he is never linked back to the /store tree. Much HTML code is generated on the fly. This code must determine if the user is logged in and setup the correct hyper links.

A example of C code to perform this function is given below:

```
void end_html(void)
{
char *where = "store";              /* Hyperlink to this directory */
int  login = 0;                     /* 1 if "known" - 0 if not */
char *cl;                           /* Character pointer */
char username[256];
cl = getenv("AUTH_TYPE");
    if (cl)
        login = ! (strcmp(cl,"Basic"));
    if (login)
    {
    cl = getenv("REMOTE_USER");
        if (cl)
            strcpy (username, cl);
        else
            login = 0;
    }
if (login) where = "known";
printf("<P></P>\n");
printf("<P><A HREF=\"/%s/search.html\">\n",where);
printf("Search again</A>\n");
printf("<A HREF=\"/%s/browse/browse.html\">\n",where);
printf("Browse again.</A>\n");
printf("<A HREF=\"/%s/welcome.html\">Return</A>\n", where);
```

-continued

```
printf("to <B>intertain.com</B>home
page.</P></BODY></HTML>\n");
}
```

Here is what the code does:

1. Assume that the user is not known and set the variable where to "store" and login to 0 (false).
2. Lookup the environment variable AUTH_TYPE to determine if user authentication is in effect. The variable cl will be set to NULL if there is no AUTH_TYPE environment variable.
3. If there is an AUTH_TYPE environment variable, and it has the value "Basic" then set the variable login to 1 (true).
4. If the user is known, lookup the environment variable REMOTE_USER and save the value of that environment variable in the variable username. This step is not strictly required for the invention to operate, however, in general the name of the user will be required at some point and it is easy to get it here.
5. If the user is known (the variable login is true), set the variable where to the value "known"
6. Generate hyperlinks (URLs) that point either to /store/search.html or /known/search.html depending on the value of the variable where.
7. In an identical way generate, hyperlinks to /store/browse.html (or /known/browse.html) and to /store/welcome.html (or /known/welcome.html).

Conclusions, Ramifications, and Scope

The description above describes the operation of the bookstore operating at http://intertain.com, however, the modification to use this invention at another bookstore or at a network store selling things other than books are obvious to one of even modest skill.

The description above describes the best mode contemplated by the inventor, however, it is obvious that the above invention can easily be adapted to other uses, such as an on-line survey, marketing questionnaire or anyplace where is useful to overcome the stateless limitation of the http protocol.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

I claim:

1. A server computer accessed by a plurality of users for ordering goods or services from a store on the world wide web using the http protocol comprising:

(a) a plurality of user profile records each containing a unique first username and a first password;
    (b) a single first set of one or more unprotected pages shared by all of said users;
    (c) a single second set of one or more protected pages capable of being shared by all of said users where each page in said second set of protected pages corresponds to exactly one page in said first set of unprotected pages;
    (d) means for allowing at least a first one of said plurality of users to access at least one of said unprotected pages without supplying a username or password;
    (e) means for allowing a second one of said plurality of users to attempt to access one of said protected pages using the http GET method;
    (f) means for returning an ACCESS DENIED code in response to said attempt whereby said ACCESS DENIED code causes said second user's browser to ask said second user for a second username and a second password and to transmit said second username and said second password to said server computer in the http authorization header; and
    (g) means for locating one of said user profile records such that said second username and said second password match the first username and first password associated with said stored user profile.

2. The server computer according to claim 1, where said ACCESS DENIED code has the value 401.

3. The server computer according to claim 1, where each said user profile record comprises at least a method of payment.

4. The server computer according to claim 1, where said user profile records further comprise a customer's name.

5. The server computer according to claim 1, where said user profile records further comprise a shipping address.

6. The server computer according to claim 1, additionally comprising means for presenting said first user with a form for entering said user's name and address when said user wants to buy an item described on said unprotected page.

7. The server computer according to claim 1, additionally comprising:

(a) means for determining if a user is pre-authorized;
    (b) means for generating a hyperlink where said hyperlink links to one of said protected pages if said user is pre-authorized and said hyperlink links to one of said unprotected pages if said user not pre-authorized.

8. The server according to claim 7, where said means for determining if a user is pre-authorized is comprised of means for looking up the value environment variable named AUTH_TYPE and comparing said value to the string "Basic".

9. A method for associating one of a first plurality of users with one of a plurality of profile records without making any modifications to said first user's software comprising:

(a) allowing said first user to attempt to access one of a plurality of protected pages, which is shared by each member of said first plurality of users and which has exactly one corresponding unprotected page which is also capable of being shared by each member of said first plurality of users, using the http GET method;
    (b) returning an ACCESS DENIED code in response to said attempt;
    (c) causing said user's browser in response to said ACCESS DENIED code to ask said first user for username and a password and to transmit said username and said password to said computer in the http authorization header; and
    (d) locating one of said user profile records such that said username and said password match the username and password associated with said user profile record.

10. In the method according to claim 8, additional steps for allowing one of a second plurality of users to make purchases without using a username and password comprising:

(e) allowing said second user to view an unprotected page;

(f) presenting said second user with a form for entering said user's name and address.

11. A server computer accessed by a plurality of users for ordering goods or services on the world wide web using the http protocol comprising:

(a) a plurality of user profile records each containing a unique first username and a first password;

(b) a single first set of one or more unprotected pages accessible by each of said users;

(c) a single set of one or more protected pages capable of being accessed by each of said users where each page in said second set of protected pages corresponds to exactly one page in said first set of unprotected pages;

(d) at least one of said unprotected pages, viewable by at least one of said users, said page containing a first hyperlink to one of said unprotected pages and a second hyper link to one of said protected pages such that:

(i) following said first hyperlink allows said user to view a description of a product or service anonymously;

(ii) following said second hyperlink causes said server to return an ACCESS DENIED whereby said user's browser asks said user for a second username and second password and said browser transmits said second username and said password to said server in the http authorization header whereby said server locates one of said user profile records such that said second username and said second password match said first username and said first password associated with said stored user profile allowing said user to view said product or service with said user's identity known to said server.

12. The server computer according to claim 11, where said ACCESS DENIED code has the value 401.

13. The server computer according to claim 11, where each said profile record comprises:

(a) a customer's name;

(b) a customer's address; and (c) a method of payment.

* * * * *